United States Patent [19]

Bartilucci et al.

[11] Patent Number: 5,487,864
[45] Date of Patent: Jan. 30, 1996

[54] MOLDING COMPOSITE BY POSITIONING HEAT-CONDUCTIVE MAT BETWEEN PLATEN AND TOOL

[75] Inventors: Anthony R. Bartilucci, Wantagh; George W. Gilchrist, N. Massapequa; Richard Yurman, Bethpage, all of N.Y.

[73] Assignee: Northrop Grumman Corporation, Los Angeles, Calif.

[21] Appl. No.: 274,248

[22] Filed: Jul. 13, 1994

[51] Int. Cl.⁶ .......................... B29C 33/40; B29C 39/20; B29C 51/10; B27N 3/12
[52] U.S. Cl. .......................... 264/219; 264/257; 264/258; 425/508
[58] Field of Search .......................... 425/508; 264/257, 264/258, 219

[56] References Cited

U.S. PATENT DOCUMENTS

| | | | |
|---|---|---|---|
| 3,466,214 | 9/1969 | Polk et al. | 425/508 |
| 4,704,240 | 11/1987 | Reavely et al. | 264/257 |
| 4,892,774 | 1/1990 | Vallance | 264/258 |
| 4,997,606 | 3/1991 | Mears et al. | 264/102 |
| 5,087,500 | 2/1992 | Kasper et al. | 156/196 |

FOREIGN PATENT DOCUMENTS 60-124238  7/1985  Japan.

Primary Examiner—Robert E. Sellers
Attorney, Agent, or Firm—Terry J. Anderson; Karl J. Hoch, Jr.

[57] ABSTRACT

A method and apparatus for manufacturing a composite article. The method comprises the step of providing an autoclave having a platen, applying a composite article onto a work tool, and positioning the work tool on the platen. The platen is heated to transfer heat from the platen to the work tool and from the work tool to the composite article to cure that article; and a heat conductive, flexible mat is positioned between the platen and the work tool to maintain a desired thermal conductivity between the platen and the work tool during the heating step.

8 Claims, 5 Drawing Sheets

MOLDING COMPOSITE BY POSITIONING HEAT-CONDUCTIVE MAT BETWEEN PLATEN AND TOOL

BACKGROUND OF THE INVENTION

This invention generally relates to the manufacture of composite articles, and more specifically, to curing composite articles in autoclaves.

The large scale manufacture of composite parts, such as fiberglass epoxy and graphite epoxy, is most often conducted in autoclaves, in which the composite articles are heated at elevated pressures to cure the articles. For instance, the composite articles may be heated inside an autoclave to temperatures between 350° and 400° F. at a pressure of 50 psig. In this process, a flexible fibrous material, referred to as the cloth, is applied onto, or layed-up on, a form, referred to as the tool or the work tool, and then a resin is applied onto, or layed-up on, the cloth. This process may be repeated several times to form several layers of the cloth-resin combination on the tool.

After the desired number of layers have been applied to the tool, air may be withdrawn from the interior of the tool to draw the cloth-resin layers tightly onto the tool. The tool is then placed on a platen located within the autoclave, and the composite material is then heated to cure that material. Typically, the manufacturer or the purchaser of the composite parts designates certain requirements, referred to as curing specifications, that must be met during the curing of the composite parts. For example, a curing specification for a composite part may set forth the maximum and minimum rates at which the temperatures of the tool and the composite part may rise during curing. The specification may also require that the temperature of the composite part be within a given range for a specified period of time, for example, 345° to 365° F. for a minimum of 1 hour and a maximum of 2 hours.

There are two well-known types of autoclaves. A first type contains a platen that is not temperature controlled. In an autoclave of this type, a composite part is heated by passing heated air in the autoclave over the part. When a composite part is cured in this type of autoclave, the composite part is first enclosed, or bagged, in a nylon material and insulation is placed locally on the outside of the bagged tool in an attempt to control the temperature rise through the composite part. Temperature uniformity throughout the part is important in order to obtain the desired curing. Determining how a particular composite part should be bagged, insulated, and positioned in the autoclave in order to achieve the desired uniform heating of the part is a tedious and time consuming task that is accomplished by a trial and error process, which must be repeated for each new tool.

In addition, numerous tools for various composite parts can be placed on a platen and simultaneously cured during one production period or cycle. Each time the tools are placed on the platen in a new configuration, the trial and error process, to determine how to achieve the desired uniform heating of the parts, must be repeated. This is because the heated air flow patterns in the autoclave and, therefore, the tool heating rates are greatly affected by the relative sizes and positions of the tools on the platen.

Also, in this type of autoclave, the effective rate at which heat is transferred to a composite part is very low because of the thermal resistance of the nylon bagging, the insulation and the composite material itself. In addition, the thermal mass of the tools, which are often solid steel, can be very large. The combination of the low heat transfer rates and large thermal masses can cause long curing times. Very often these long curing times exceed the specification requirements for the acceptable curing of a particular part.

A second type of autoclave contains a heated platen capable of being temperature controlled, and a composite part is heated in the autoclave by placing the part on the platen and heating the platen. The heated platen conducts heat to the tool at a rate that is much more uniform and rapid than can be achieved in an autoclave where only heated air is used to heat the tool. This allows the composite part to reach the cure temperature more quickly than in an autoclave in which only heated air is used to heat the part, reducing the total amount of time that the composite part must be heated in the autoclave in order to cure.

This is important because many curing specifications limit the total amount of time that a composite part may be at or above a given temperature, and composite parts, after being cured, are sometimes placed in and reheated in the autoclave. This may be done, for example, to help form other composite parts or to join one composite part to another composite part as the latter part is being formed. Reducing the amount of time that a composite part is initially heated in the autoclave to cure the part, increases the amount of time that the composite part may be later heated in the autoclave during these subsequent procedures, commonly referred to as next assembly procedures.

To cure a composite part in an autoclave of this second type, the part is bagged in a nylon material and placed on a platen, but it is usually not necessary to apply any external insulation to the outside of the bagged tool. Numerous tools for various parts can be placed on the heated platen during any production cycle.

In autoclaves of this type, most of the heat transfer is conducted from the platen to the tool through the contact between the platen and the base of the tool. This heat transfer rate is at least an order of magnitude greater than that from the heated air in the autoclave to the composite part, through the nylon bagging covering the tool. Thus, the heating and curing of the composite part is basically independent of the heated air flow patterns in the autoclave, as well as the relative sizes and/or positions of the tools on the platen. The effective heat transfer rate to the base of the tool is very high and uniform, and this uniform, high heat flux is then distributed by conduction through the tool to the composite material.

Because of these high heating rates, the large thermal masses of the tools is no longer a significant issue, and acceptable curing times that meet the applicable specification can usually be achieved. Because of these advantages, the heated platen autoclave is normally the instrument of choice for the large scale manufacture of composite parts.

Two difficulties may be encountered in the use of heated platen autoclaves that can make it difficult to cure composite material parts properly. The first difficulty—a condition referred to as out of plane—is the localized separation of the tool base plate from the platen during the cure cycle. This separation can be the result of distortion of the base plate and/or the platen caused by large and rapid temperature rises of the base plate and the platen during the curing cycle. This localized separation can also result from the fact that the contiguous surfaces of the platen and the base plate may not be perfectly flat or planar, and this may be caused by tolerances allowed in the design and manufacture of the platen and the tool base plate.

In both of these instances, the out-of-plane condition introduces air gaps in those areas where the tool base plate is not in direct contact with the platen. These gaps can be of variable depth—from 1 to 20 thousandths of an inch. The relative out-of-plane condition of the platen and the tool base is also highly dependant on the precise location and orientation of the tool on the platen.

Since air is a good thermal insulator, the local heat transfer rate at an air gap may be only 1/10th of the rate at those areas where the tool base plate is in contact with the platen. The resulting large differences in the heating rates of different areas of the tool causes non-uniform heating of the tool and the composite material. This difficulty is compounded when multiple parts, such as 10 or more, are cured in a single production cycle. This problem often results in an inability to satisfy the curing specification setting forth the required temperature uniformity of the composite part during the curing cycle. The unequal heat transfer rates caused by localized separation of the platen and the tool base also make it more difficult to repeat the same curing procedure over numerous production cycles or runs.

A second difficulty that can arise when using a heated platen autoclave occurs when the composite part being manufactured requires a tool of varying cross section. This can cause the amount of the tool mass directly above each unit area of the tool base plate to vary significantly across the tool, and this can cause the temperatures of the tool and of the composite part to rise non-uniformly during the curing of the composite part. This difficulty also may result in an inability to satisfy the curing specification requirements.

SUMMARY OF THE INVENTION

An object of this invention is to improve methods and systems for curing composite parts in autoclaves.

Another object of this invention is to achieve uniform curing temperatures of composite part materials.

Another object of the present invention is to improve the transfer of heat from a platen of an autoclave to a composite part being cured in the autoclave.

A further object of this invention is to insure good thermal conductivity between the platen of an autoclave and a work tool being heated therein despite changes in the shape of the work tool and even though the platen and the work tool may be out of plane.

Still another object of this invention is to vary the heat transfer rate between a platen of an autoclave and a work tool positioned on the platen to compensate for non-uniform mass of the work tool along its length and thereby heat more uniformly a composite article applied on the work tool.

These and other objectives are attained with a method and apparatus for manufacturing a composite article. The method comprises the step of providing an autoclave having a platen, applying a composite article onto a work tool, and positioning the work tool on the platen. The platen is heated to transfer heat from the platen to the work tool and from the work tool to the composite article to cure that article; and a heat conductive, flexible mat is positioned between the platen and the work tool to maintain a desired thermal conductivity between the platen and the work tool during the heating step.

The mat has sufficient flexibility to stay in direct contact with both the platen and the work tool and thus maintain a high thermal conductivity between the platen and the work tool—despite the fact that the platen and the work tool may be out of plane or change shapes as they are heated. Also, in case the work tool does not transfer heat uniformly to the composite article, which may happen, for example, when the work tool does not have a uniform cross-section, then an opening or openings may be formed in a selected area or areas of the mat to provide the mat with non-uniform heat transfer characteristics. The heat transfer characteristics of the mat may be chosen to compensate for the non-uniform heat transfer characteristics of the work tool, so that heat is transferred uniformly to the composite article and the temperature thereof rises uniformly during the heating step.

Further benefits and advantages of the invention will become apparent from a consideration of the following detailed description given with reference to the accompanying drawings, which specify and show preferred embodiments of the invention.

DETAILED DESCRIPTION OF THE PREFERRED EMBODIMENTS

Figure 1:
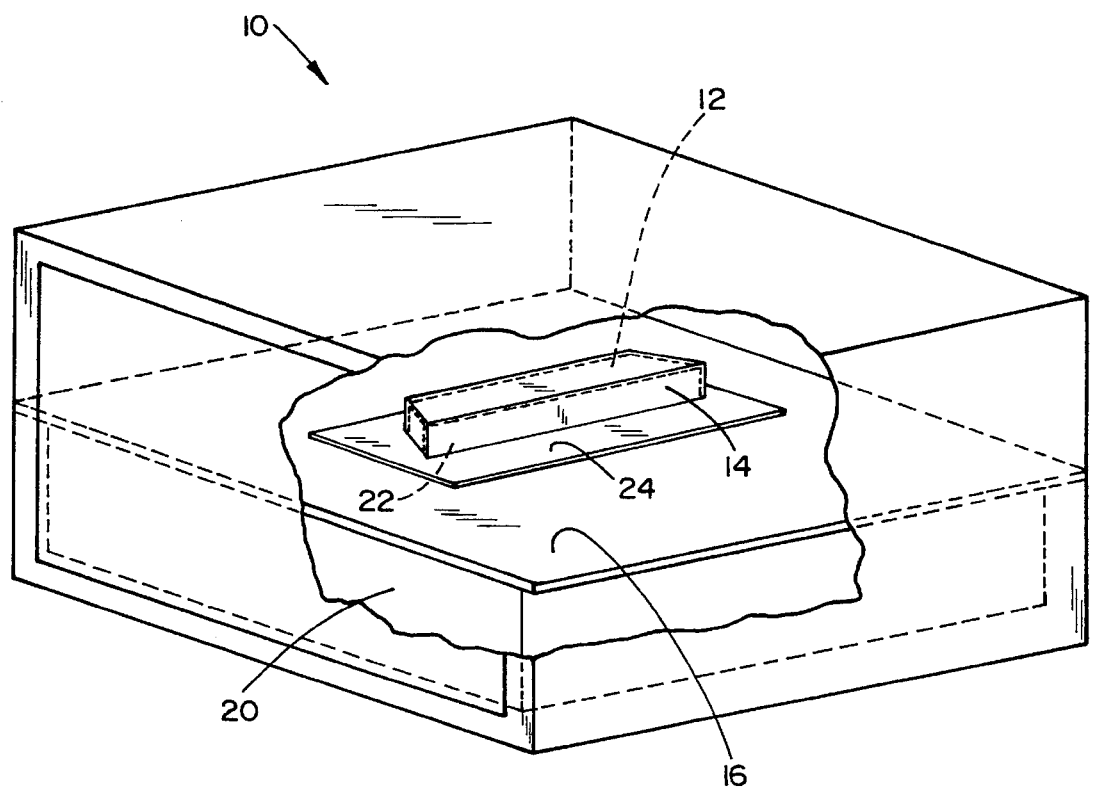
FIG. 1 illustrates a conventional autoclave, with portions of the outer walls thereof broken away to show a work tool and a composite part inside the autoclave.
Figure 2:
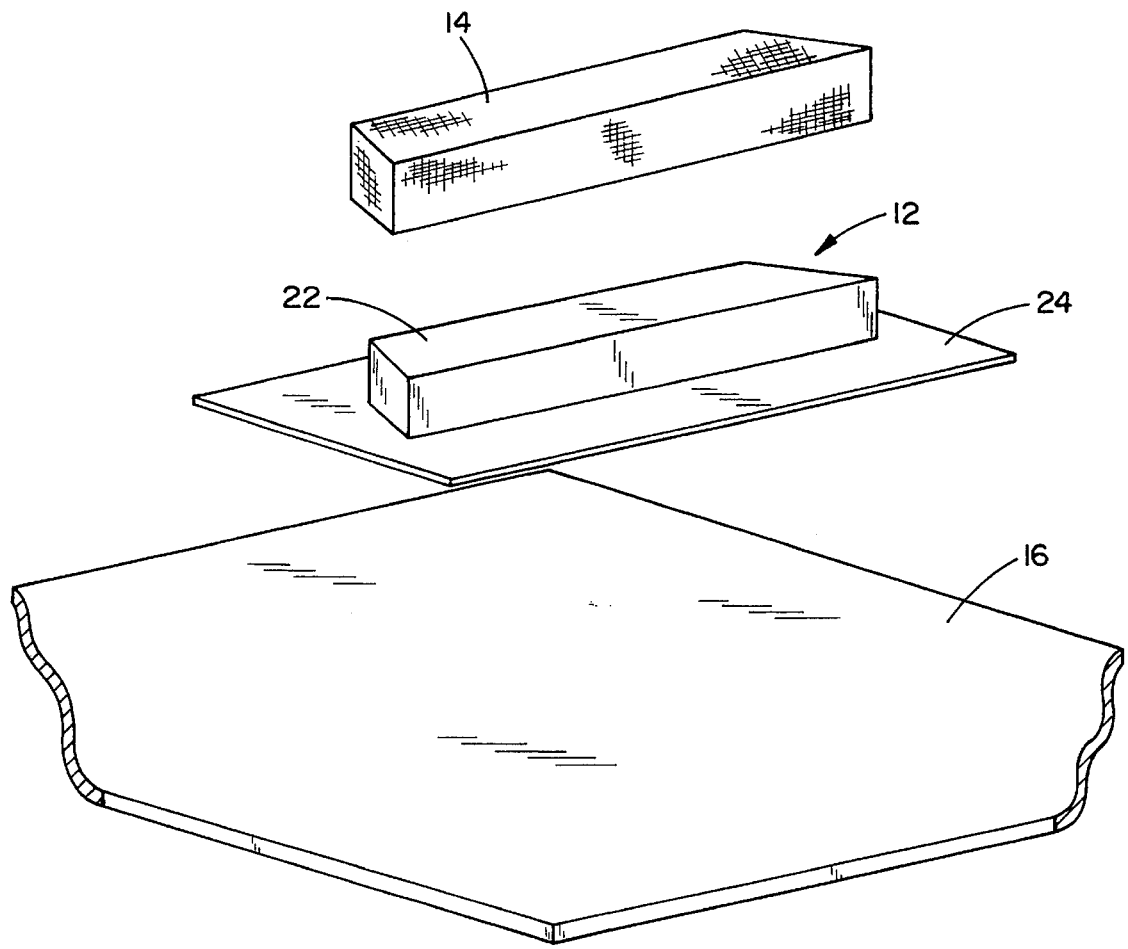
FIG. 2 is an exploded view showing portions of a platen of the autoclave, the work tool and the composite part.

FIG. 1 illustrates autoclave 10, work tool 12, and composite part 14. With reference to FIGS. 1 and 2, autoclave 10 is preferably of a conventional or standard design and construction and includes platen 16 and heating means 20 for heating the platen. Work tool 12 includes tool body 22 and tool base plate 24, and the work tool is positioned on and supported by platen 16. Work tool 12, particularly tool body 22, serves as a form or mold for composite part 14, which comprises a fibrous cloth and a resin, both of which are applied, in one or more layers, onto the work tool. Tool body 22 and tool base 24 are releasably connected together, and the tool base is provided to facilitate handling and transporting the work tool.

Generally, heating means 22 is operated to heat platen 16; and heat is transmitted from the platen to work tool 12 and thence to composite part 14, curing that part. As the composite part cures, it hardens into a form having the shape of the work tool, or the portion thereof onto which the composite part was applied.

Figure 3:
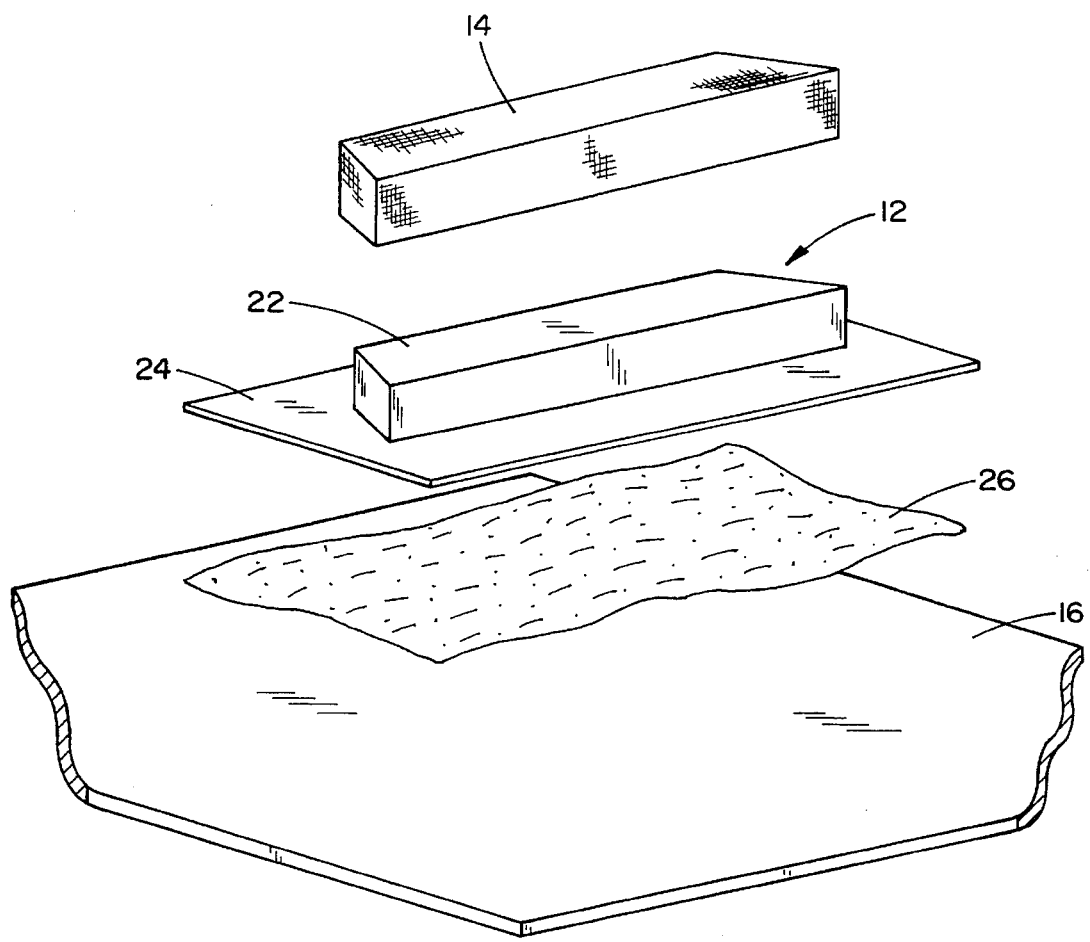
FIG. 3 shows a thermally conductive mat disposed between the platen and the work tool.

As mentioned above, one difficulty with this general procedure is that small localized separations may exist, or develop, between the platen and the tool base plate. With reference to FIG. 3, this invention remedies or alleviates this problem by introducing a flexible, resilient and thermally conductive mat 26 between the tool base plate 24 and the platen 16. One suitable thermal interface material, which is presently commercially available, is a conductive elastomer laminate manufactured by Chomerics, Inc. of 23839 S. Banning Blvd., Carson Calif. 90475. The CHO-THERM T274 material consists of an extremely soft (hardness value of 3 durometers) silicon elastomer loaded with aluminum oxide particles and laminated to a thermally conductive reinforcing material, such as fiberglass, which resists puncture and eases handling. The material can be used in repeated applications at the elevated temperatures required for the proposed application i.e., approximately 400° F.

The flexible elastic nature of this material allows for blanketing highly uneven surfaces, allowing for the uniform heat transfer over an entire area. For example, if a sheet of CHO-THERM T274 material 0.070 inches thick were interposed between the tool base plate and the platen, then the resultant thermal conductance would be 130 BTU/HR-FT$^2$-°F. The thermal conductance of a 10 mil air gap at an average temperature of 200° F., for example, is approximately 20 BTU/HR-FT$^2$-°F. Therefore, if the elasticity of the 70 mil elastomer interface material were sufficient to enable the mat to fill completely the 10 mil air gap, then the local heat transfer rate would be improved by a factor of 6.5. The uniform heating of the tool base, which this invention provides, significantly improves the ability to cure and manufacture high production volumes of composite parts at substantial cost savings.

As an alternative, the flexible mat may be made from a weave of spring steel. Each thread of steel may be 0.010 inches thick, and one-quarter inch wide steel strips may be formed into a pattern with a wave height, for example, of 0.050 inches. A first set of strips may extend along the length of the base plate and a second set of strips may extend along the width of the base plate. The lengths of the strips in these first and second sets may be equal to the length and width of the base plate respectively.

A second difficulty with prior art procedures occurs when the composite part being manufactured requires a work tool that has a varying cross-section or, for another reason, does not conduct heat uniformly from the platen to the composite part. Such a tool, for example, is shown at 30 in FIG. 4. Tool 30 has a top surface 32 and a recess 34 extending inward from that surface. With this shape, the rate at which heat is transmitted through the portion of the tool directly below recess 34 is higher than the rate at which heat is transmitted through the rest of the tool. This varying cross-section may thus cause the temperatures of the work tool and the composite material to increase non-uniformly.

Figure 4:
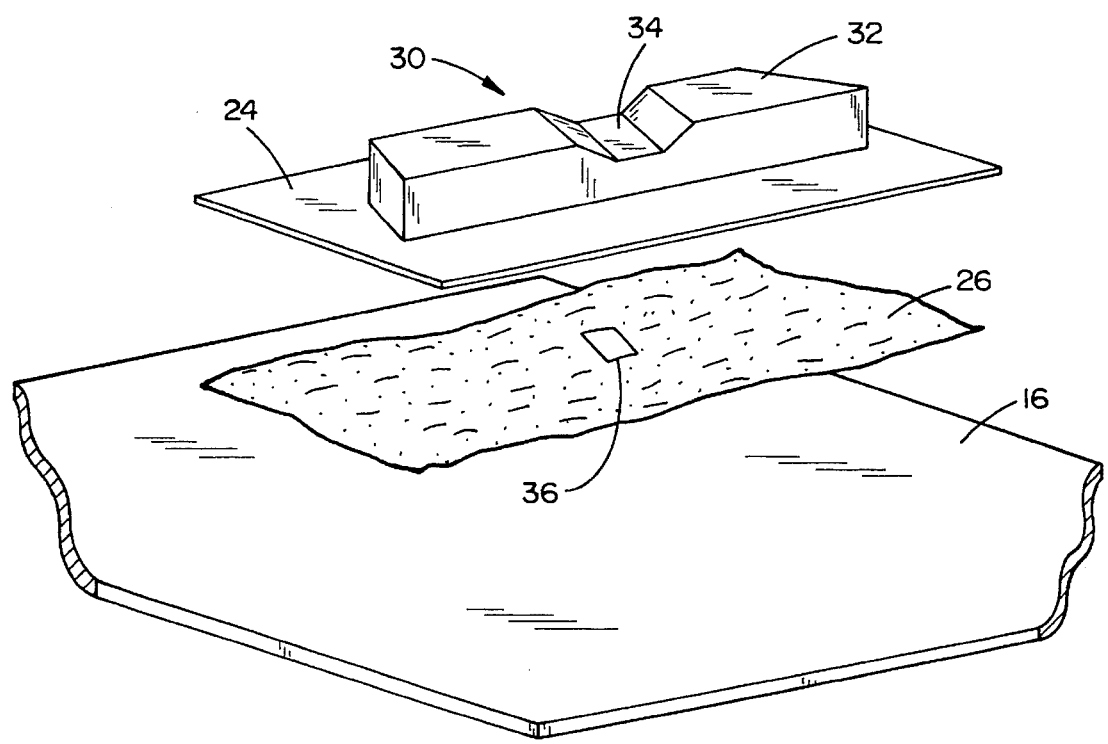
FIG. 4 illustrates an alternate work tool and a modified thermally conductive mat disposed between the tool and the platen.

In accordance with the present invention, this difficulty is remedied or alleviated by removing or cutting out selected areas in the thermally conductive mat 26 between the tool base plate 12 and the platen 16, such as shown at 36 in FIG. 4. For example, for the sheet of CHO-THERM T274 material 0.070 inches thick interposed between the tool base plate and the platen, the resultant thermal conductance is 130 BTU/HR-FT$^2$-°F. If areas were opened through the full 70 mil thickness of the mat, then the thermal conductance in those areas would be approximately 3 BTU/HR-FT$^2$-°F. As a result, in those areas, the heat transfer would be insignificantly small as compared to the areas where the mat was intact. By punching out small holes or cutting out large areas, the local heat flux to the tool base can be selected for virtually any tool mass distribution.

Thus, this invention provides an arrangement by which the heat transfer rate through the tool base can be varied, in a highly selective and controlled manner, across the surface area of the tool base. In this way, non-uniform heating of the tool caused by non-uniform mass distribution, or any other reason, can be eliminated, and this significantly improves the ability to cure and manufacture high production volumes of composite parts at great cost savings.

Figure 5:
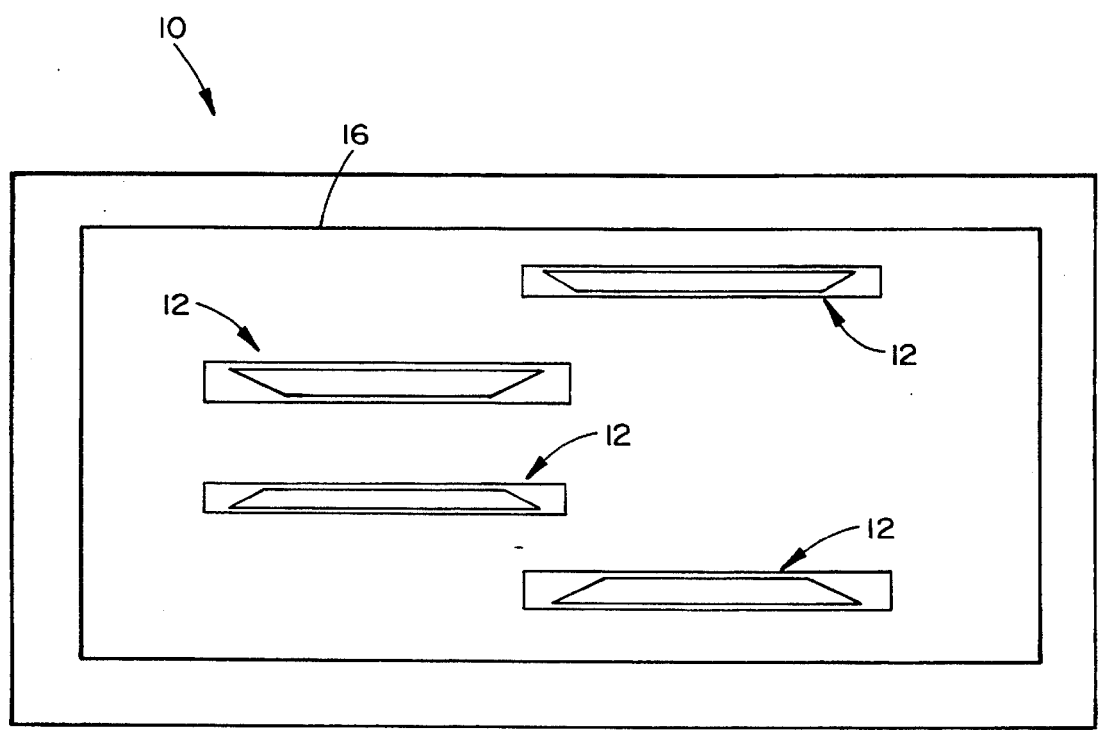
FIG. 5 is a plan view of the autoclave, showing a multitude of work tools positioned on the platen of the autoclave.

As described above, a single work tool 12 or 30 is positioned on platen 16. It should be noted that the present invention may also be practiced to cure multiple composite articles simultaneously. For instance, FIG. 5 shows four work tools 12 and four composite articles 14 on platen 16 of autoclave 10, and one or more flexible heat conductive mats 26 (not shown in FIG. 5) may be interposed between platen 16 and the work tools 12. For example, a single flexible heat conductive mat may be interposed between the platen and all four of the work tools, or a respective one flexible mat may be interposed between the platen and each one of the work tools.

While it is apparent that the invention herein disclosed is well calculated to fulfill the objects previously stated, it will be appreciated that numerous modifications and embodiments may be devised by those skilled in the art, and it is intended that the appended claims cover all such modifications and embodiments as fall within the true spirit and scope of the present invention.

What is claimed is:

1. A method of manufacturing a composite article, comprising:

providing an autoclave having a platen;

applying a composite article onto a work tool;

positioning the work tool on the platen;

heating the platen to transfer heat from the platen to the work tool and from the work tool to the composite article to cure said article; and positioning a heat conductive, flexible mat between the platen and the work tool to maintain a high thermal conductivity between the platen and the work tool during the heating step.

2. A method according to claim 1, wherein:

the heating step includes the step of changing the shape of the work tool; and the positioning step includes the step of, the mat flexing to keep in direct contact with the work tool completely over at least a predetermined area thereof despite changes in the shape of the work tool.

3. A method according to claim 2, wherein the mat is formed of a weave of spring steel.

4. A method according to claim 3, wherein the weave of spring steel includes a multitude of wire threads, each of the wire threads having a diameter of about 0.010 inches.

5. A method according to claim 1, wherein:

the platen includes a top surface;

the work tool includes a bottom surface;

the step of positioning the work tool on the platen includes the step of positioning an area of the bottom surface of the work tool above an area of the top surface of the platen;

said areas of the bottom surface of the work tool and the top surface of the platen include irregularities that prevent said areas from being in direct contact completely over said areas; and the flexible mat is in direct contact with the top surface of the platen and the bottom surface of the work tool completely over said areas despite said irregularities.

6. A method of manufacturing a composite article, comprising:

providing an autoclave having a platen;

applying a composite article onto a work tool;

positioning the work tool on the platen;

heating the platen to transfer heat from the platen to the work tool and from the work tool to the composite article to cure said article;

positioning a heat conductive, flexible mat between the platen and the work tool to transfer heat from the platen to the work tool; and forming the mat to maintain a predetermined temperature profile across the composite article.

7. A method according to claim 6, wherein the forming step includes the step of forming an opening in the mat at a selected location thereof to reduce the heat transfer rate between the platen and the work tool, through the mat at said selected location.

8. A method according to claim 7, wherein:

the work tool has a non-uniform heat transfer characteristic; and the forming step includes the step of providing the mat with a non-uniform heat transfer characteristic to compensate for the non-uniform heat transfer characteristic of the work tool, so that the temperature of the composite article rises uniformly during the heating step.

* * * * *